United States Patent [19]

Röhm

[11] Patent Number: 4,703,941

[45] Date of Patent: Nov. 3, 1987

[54] HAMMER DRILL CHUCK ASSEMBLY

[76] Inventor: Günter H. Röhm, Heinrich-Röhm-Str. 50, 7927 Sontheim, Fed. Rep. of Germany

[21] Appl. No.: 839,422

[22] Filed: Mar. 13, 1986

[30] Foreign Application Priority Data

Mar. 14, 1985 [DE] Fed. Rep. of Germany ....... 3509165

[51] Int. Cl.⁴ .............................................. B23B 31/04

[52] U.S. Cl. ....................................... 279/62; 408/240

[58] Field of Search ................................. 279/19–19.7, 279/60–65, 75; 173/48; 408/239 R, 239 A, 240

[56] References Cited

U.S. PATENT DOCUMENTS

| | | | |
|---|---|---|---|
| 2,684,856 | 7/1954 | Stoner | 279/61 |
| 3,985,368 | 10/1976 | Better et al. | 279/75 |
| 4,131,165 | 12/1978 | Wanner et al. | 279/19.3 |
| 4,491,444 | 1/1985 | Rumpp et al. | 173/48 |

FOREIGN PATENT DOCUMENTS

| | | | |
|---|---|---|---|
| 2826153 | 12/1979 | Fed. Rep. of Germany | 279/19 |
| 3413581 | 10/1985 | Fed. Rep. of Germany | |

*Primary Examiner*—Z. R. Bilinsky
*Attorney, Agent, or Firm*—Karl F. Ross; Herbert Dubno

[57] ABSTRACT

The percussion drill apparatus is comprised of a drill spindle which powers the chuck, and the connection for rotation of the drill chuck to the drill spindle is by way of at least one coupling element which is secured in retainers respectively provided in the drill spindle and the chuck body, but allowing the operating mode with axial shifting or displacement, which mode can be terminated, or selected, by a locking mechanism having a coupling ring. The locking mechanism includes a lock element which is guided in the chuck body and which can project into a longitudinal groove extending axially in the drill spindle. The lock element can be actuated by a control sleeve which surrounds the chuck body and which can be rotated with respect thereto, to be moved, for precluding the axial displacement, into a retainer depression or pocket at the respective upper terminus of the longitudinal groove. The control sleeve includes a radially outwardly directed formation which allows exit of the lock element from the depression, and it is taken along when considered in the direction of rotation by the coupling ring. At its rim which is directed towards the control ring, the coupling ring has teeth which can engage in matching teeth of the control ring.

14 Claims, 3 Drawing Figures

HAMMER DRILL CHUCK ASSEMBLY

CROSS REFERENCE TO RELATED APPLICATIONS

This application is related to my commonly owned copending application Ser. No. 839,421 and Ser. No. 839,789 and the following additional applications:

| Ser. No. | Filing Date |
|---|---|
| 808,894 | 13 December 1985 |
| 808,891 | 13 December 1985 |
| 808,893 | 13 December 1985 |
| 788,775 | 18 October 1985 |
| 744,795 | 13 June 1985 |
| 702,049 | 15 February 1985 |
| 702,053 | 15 February 1985 |
| 686,243 | 26 December 1984 |
| 743,583 | 11 June 1985 |
| 658,133 | 5 October 1984 |
| 726,596 | 23 April 1985 |
| 726,587 | 23 April 1985 |
| 731,655 | 7 May 1985 |
| 719,760 | 4 April 1985 |
| 720,259 | 5 April 1985 |
| 703,888 | 21 February 1985 |
| 654,792 | 26 September 1984 |
| 654,791 | 26 September 1984 |
| 591,975 | 21 March 1984 |

and the applications referred to therein.

FIELD OF THE INVENTION

My present invention relates to percussion or hammer drill chuck assembly. More particularly, the present invention relates to percussion or hammer drill assembly wherein the drill chuck is mounted on the drill spindle for rotation therewith, and in which the drill spindle has a longitudinal axial passage through which the impact force or action of a central impact shaft or rod is imparted to the drill bit which is held in the drill chuck between centrically adjustable chuck jaws.

BACKGROUND OF THE INVENTION

In impact drill chucks the central rod is axially guided in the hollow drill spindle, and at least one coupling element is provided for connecting the drill chuck to the drill spindle. The coupling element can be arranged on the one hand in retainers of the drill spindle, and on the other hand in retainers in the chuck body of the drill chuck. As a function of its setting, the coupling element can allow an operating mode in which an axial play or displacement is permitted for the chuck body with respect to the drill spindle, and this axial play can be eliminated by way of a locking mechanism having a coupling ring.

The German patent publication DE-OS No. 34 13 581 (see the aforementioned applications as well) discloses a percussion drill in which the locking mechanism is a contact ring which is arranged on the drill spindle so that it can rotate or turn, but it is fixed when considered axially or longitudinally.

The contact ring is axially juxtaposed with an annular shoulder of the drill spindle, and it carries abutment or contact projections which are directed towards the annular shoulder. The abutment or contact projections preclude the axial shifting or displacement of the drill chuck on the drill spindle when they come into operative contact with the spindle's annular shoulder, i.e. the respective annular surface thereof.

The annular surface of the annular shoulder includes abutment recesses into which the abutment projections can extend, and the depth of these abutment recesses is at least equivalent to the magnitude of the permitted axial displacement or play of the drill chuck.

Accordingly, when the contact ring is turned such that the abutment projections are in alignment with the recesses and the projections can enter into the respective recesses, the axially directed shifting is set free, i.e. the axial displacement mode is available.

It follows that the drill spindle must be provided with abutment recesses which are adapted in size to the abutment projections of the chuck that is being used. Furthermore, the mentioned locking mechanism is primarily intended for such impact drills in which the axial displacement is of relatively minor magnitude, i.e. there is only a minor stroke or displacement distance.

However, when a chuck is to carry out a large stroke, for example, as large as that of the drill, in the mentioned locking mechanism the size (length) of the chuck is approximately increased in conformity with the distance of stroke of the attendant motion. Finally, in a percussion drill of the type described some inherently undesirable operational conditions may arise in that during the percussion operations with the mode with axial play the lock ring is not locked. Conversely, when the axial play mode is not used for normal drilling, the lock ring is locked, i.e. it can then not be used for clamping a drill.

OBJECTS OF THE INVENTION

It is accordingly an object of my invention to provide a percussion drill assembly in which the chuck can carry out a considerable axial displacement.

It is also an object of the invention to provide a percussion drill assembly in which the chuck is of relatively compact overall length.

It is further an object of the invention to provide a percussion drill assembly in which the lock element and its actuating components are of simple yet effective design.

It is furthermore an object of the invention to provide a percussion drill assembly in which in conformity with the operating position of the control ring, the clamping ring can freely rotate when the axial displacement mode is not available, and in which the clamping ring is held so as not to rotate when the axial displacement mode is selected for the operation.

SUMMARY OF THE INVENTION

These and other objects are attained in accordance with the invention in a locking mechanism which includes a lock or latch element guided in the chuck body and which can project into a longitudinal groove extending axially in the drill spindle.

The lock element can be actuated by a control sleeve which surrounds the chuck body and which can be rotated with respect thereto, for moving the lock element, when selecting the operational mode without axial displacement, into a retainer depression arranged at the upper terminus of the longitudinal groove.

The control sleeve includes a radially outwardly directed formation which allows exit of the lock element from the retainer depression, and the control sleeve can be taken along in its direction of rotation by the coupling ring which is axially movable but which can be secured so as not to rotate.

At its rim which is directed towards the control ring, the coupling ring is formed with teeth which can engage in matching teeth of the control ring when the coupling ring is axially displaced towards the drill end.

The longitudinal groove for the lock element can be an annular groove.

In accordance with a preferred embodiment, the groove is formed by a longitudinal groove which is closed at its ends and which has a length adapted in size to the axial displacement. The retainer depression at the end which is opposite to the jaws of the longitudinal groove is preferably shaped in the manner of a pocket. This will allow the opportunity to eliminate a coupling element which otherwise effects a positive connection of the drill chuck and the drill spindle.

It is also preferred that the control sleeve be secured to a connector ring which concentrically surrounds the control sleeve. This connector ring is axially fixed with respect to the chuck body, but it is adapted to be engaged with the coupling ring in a manner allowing rotation.

In accordance with another preferred embodiment, the coupling ring, when considered in its direction of shifting, is subjected to the force of a spring which is supported at the connector ring or the control sleeve.

At least one contact head is provided at the chuck body, for which in the wall of the coupling ring there is provided a cam formation recess which is formed by two axial grooves which extend alongside one another and which are of different lengths. These two grooves are open on the side towards the control ring, for the entry of the contact head, wherefore the coupling ring can be rotated on the chuck body so that either one or the other of the two grooves is axially aligned with the contact head.

BRIEF DESCRIPTION OF THE DRAWING

The above and other objects, features and advantages of the present invention will become more readily apparent from the following description, reference being made to the accompanying diagrammatic drawing in which.

SPECIFIC DESCRIPTION

Figure 1:
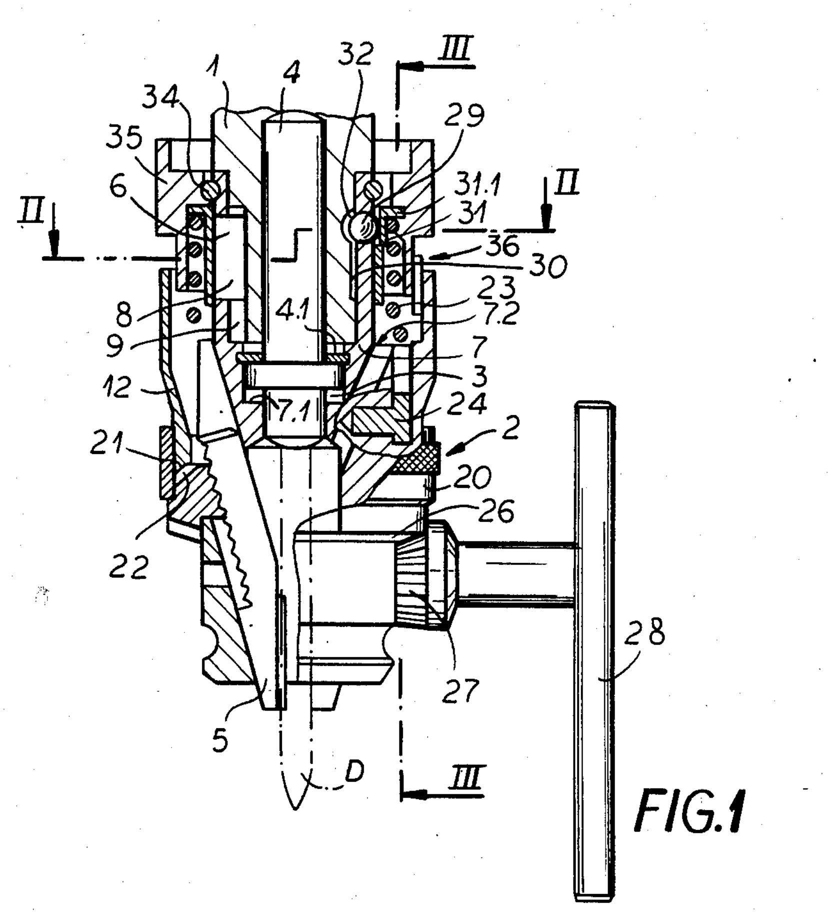
FIG. 1 shows a percussion drill assembly according to the invention in longitudinal axial cross section and partially in side elevation.
Figure 3:
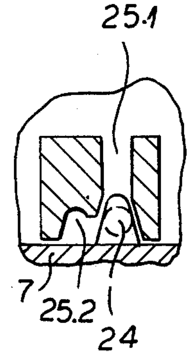
FIG. 3 is a cross-section along line III—III in FIG. 1 with the mode in which the axial displacement is available.

The percussion drill assembly shown in the drawing comprises a drill spindle 1 of which only the lower portion is shown in the drawing. A drill chuck, generally identified by the reference numeral 2, is secured to the drill spindle 1 so as to be turned and/or to carry out the attendant motions therewith. The chuck 2 has a central axial passage 3 through which the percussion or impact action or stroke of a central shaft 4 is transferred or imparted to the end of the respective drill D which can be secured in the jaws 5 which, in turn, can be centrically adjusted by way of the control ring 20. The anvil shaft or central shaft 4 is axially guided in the hollow drill spindle 1, and it is also only shown in part in FIG. 1.

The drill chuck 2 rotates with the drill spindle 1 because of coupling elements 6 which, when considered in the direction of rotation, engage positively in coupling retainers 8 and 9 which are respectively associated with the drill spindle 1 and with the drill chuck body 7. The coupling element 6 allows the mentioned axial displacement of the chuck 2 at the drill spindle 1. The axial displacement can be precluded by a locking mechanism by means of a coupling ring 12.

The shaft 4 can abut at a snap ring 4.1 or on a shoulder 7.1 of the chuck body 7.

For this purpose, the lock mechanism includes a lock or latch element 29 which is guided in the chuck body 7. The latch element is mounted so that it can project into a groove 30 which is also formed with a retainer depression 32. The lock element 29 can be moved forwardly into the mentioned retainer depression. This can be done by way of a control sleeve 31 which surrounds the chuck body 7 and which can be rotated with respect thereto, for precluding the axial displacement.

The control sleeve 31 includes a radially outwardly directed formation 33 which allows exit of the lock element 29 from the retainer depression 32. Furthermore, the control sleeve 31 is adapted to be rotatably entrained by the coupling ring 12 which can axially move, but which can be secured so as not to perform rotary motion.

The groove 30 is a longitudinal groove which has closed ends, and its length is selected in consideration of the desired axial displacement. The retainer depression 32 is arranged at the end of the longitudinal groove 30 which is opposite to the jaws 5, i.e. the upper terminus of groove 30, and the retainer depression 32 thereat is shaped like a pocket. Accordingly, by way of the lock element 29 there is provided, between the chuck 2 and the drill spindle 1, a connection ensuring rotation so that the coupling element or key 6 may not be necessary.

The control sleeve 31 is positively connected to a telescoping or connector ring 35 which surrounds the sleeve 31 and with respect to the chuck body 7 it is axially fixed by a further ring or sleeve, for example a snap ring 34. The connector ring 35 is secured, as indicated at 36, to the coupling ring 12 in the manner allowing rotation. The coupling ring 12, in turn, remains free for axial displacement, but on rotation carries along the connector ring 35.

Figure 2:
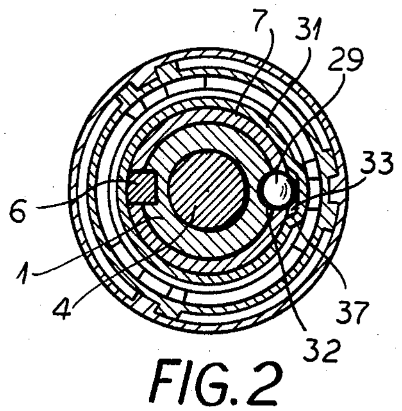
FIG. 2 is a cross-sectional view through the drill in the direction of line II—II in FIG. 1.

In the position of the coupling ring 12 indicated in FIGS. 1 and 2, the lock element 29, e.g. a steel ball, is positioned in the retainer formation 33 of the control sleeve 31, i.e. it has moved from the retainer depression 32 into the groove 30. The chuck body 7 can then carry out an axial displacement with respect to the drill spindle 1, whereby the lock element 29 is moving in the longitudinal direction of the groove 30. On the other hand, when the coupling ring 12 is adjusted in its direction of rotation, the lock element 29, via the connector ring 35 and the control sleeve 31, is moved—also by way of the inclined surface 37 which borders at the formation 33—to be positioned radially inwardly into the retainer depression 32. When the lock element 29 has attained this position, the axial displacement mode of the chuck body 7 is no longer available.

In order to prevent during percussion operation, i.e. when making use of the axial displacement, the chuck 2—under the strains of the percussion drilling operation—from becoming loose by itself, or tightening, such that a desired axial displacement of the drill tool in the retention formed by the jaws 5 would be lost, the coupling ring 12 has a plurality of teeth 21 in its rim which is directed towards the control ring 20. These teeth 21 can engage and cooperate with matching teeth 22 of the control ring 20.

When considered in its direction of movement the coupling ring 12 is subjected to the force of a spring 23 which, in the shown embodiment is supported at the chuck body 7 by an annular shoulder 7.2, and by an annular collar 31.1 at the control sleeve 31. Accordingly, the coupling ring 12 is pushed in axial direction towards the drill D, and this will invoke the operational mode without axial displacement.

As well, the chuck body 7 has at least one contact head 24 for which a cam formation recess is provided in the wall of the coupling ring 12. This cam formation recess is formed by two axial grooves 25.1 and 25.2. These two grooves 25.1 and 25.2 extend alongside one another, and they are of different lengths, whereby the grooves 25.1 and 25.2 on the side towards the control ring 20 are open for the entry of the contact head 24. The coupling ring 12 can then be rotated on the chuck body 7 in such a way that either one or the other of the two grooves 25.1 and 25.2 is axially aligned with the contact head 24.

The contact head 24—when considered in the longitudinal direction of the grooves 25.1 and 25.2—is extended by a transverse member and the lateral flanks of this extension provide contact surfaces for the flanks of the grooves 25.1 and 25.2. The contact head 24 can be the terminus of a pin which can be introduced in radial direction into a bore in the chuck body 7 and this anchors the contact head 24 at the chuck body 7.

The chuck 2 is otherwise of conventional construction. Thus, the chuck body 7 guides the chuck jaws 5. The adjustment of these at the chuck body 7 is by way of the control ring 20 which engages with interior screw threads in a corresponding formation of the jaws 5. The control ring 20, in turn, has a gear formation 26, the teeth of which engage in teeth of a bevel gear 27 of a tightening key 28 which can be introduced for tightening or loosening the chuck 2.

I claim:

1. A percussion drill apparatus comprising:
- a hollow percussion drill spindle, formed with a groove including a retainer depression at a terminus of said groove;
- an impact rod axially guided in said hollow percussion drill spindle for imparting percussion action to a drill bit;
- a drill chuck mounted on said spindle for receiving said bit, said drill chuck being capable of being operated in a mode with axial displacement and in a mode without axial displacement with reference to said drill spindle, and including a body with an axially directed passage therethrough for transferring the action of said rod to the drill bit;
- a control ring for actuating chuck jaws on said body for gripping and releasing said bit, said control ring having teeth formed in one face thereof;
- a coupling ring mounted for displacement, but which can be secured to prevent the ring from rotating, said coupling ring having a rim directed towards said control ring provided with a plurality of teeth which on axially shifting of the coupling ring towards a drill bit end of the chuck can operatively engage in the teeth of said control ring, at least one lock element guided in said chuck body and adapted to project into said groove in said drill spindle; and
- a control sleeve for actuating said lock element, said control sleeve surrounding said chuck body and being adapted to be rotated with respect thereto by said coupling ring, said control sleeve including a radially outwardly directed formation which is of sufficient extent to allow egress of lock element from said retainer depression.

2. A percussion drill assembly comprising:
- a hollow percussion drill spindle formed with coupling retainers and at least one longitudinal groove including a retainer depression at one terminus of said groove;
- a drive shaft axially disposed and guided in said hollow percussion drill spindle for imparting percussion action to a drill bit;
- a drill chuck mounted on said percussion drill spindle, said drill chuck being capable of being operated in a mode with axial displacement and a mode without axial displacement with reference to said drill spindle, and said drill chuck including a body with an axially directed passage therethrough for transferring the action of said drive shaft to the respective drill, said chuck body having formed in it coupling retainers;
- a least one coupling element for connecting said drill chuck to said drill spindle to carry out the respective motion therewith, said coupling element being adapted to be positioned in a respective coupling retainer of said drill spindle, and in a respective coupling retainer in said chuck body of said drill chuck, with each coupling retainer being dimensioned to allow axial displacement of said drill chuck with reference to said drill spindle;
- a plurality of chuck jaws movably guided in said chuck body and along said drill spindle holding said bit;
- a control ring for actuating said chuck jaws for gripping and releasing a respective drill tool, said control ring having teeth arranged in one face thereof;
- a locking mechanism including a coupling ring and at least one lock element, said at least one lock element being guided in said chuck body and being adapted to project into said at least one longitudinal annular groove in said drill spindle, said coupling ring being mounted in such a way that it can be displaced in axial direction, but which can be secured to be precluded to carry out rotating movements, said coupling ring, at a rim which is directed towards said control ring, having a plurality of teeth which on axially positioning of the coupling ring towards the drill end of the chuck can operatively engage in the teeth of said control ring; and
- a control sleeve for actuating said lock element, said control sleeve surrounding said chuck body and being adapted to be rotated with respect thereto by said coupling ring, said control sleeve including a radially outwardly directed formation which is of sufficient extent to allow egress of said at least one lock element from said retainer depression.

3. The percussion drill as defined in claim 1 wherein the chuck jaws are centrically adjusted by said control ring.

4. The percussion drill as defined in claim 1 wherein said at least one lock element is radially guided in said chuck body.

5. The percussion drill as defined in claim 1 wherein said at least one groove is a longitudinal groove which has a length adapted in size to the axial displacement, wherein said retainer depression is located at its terminus which is opposite to the jaws of said drill chuck, and wherein said retainer depression are pocket-shaped.

6. The percussion drill as defined in claim 1 wherein said at least one groove is an annular groove.

7. The percussion drill as defined in claim 1 and further comprising a connector ring positively secured to said control sleeve so as to substantially surround it, said connector ring being adapted to be secured at said coupling ring so as to be able to rotate therewith but to be precluded to be shifted in axial direction.

8. The percussion drill as defined in claim 7 wherein said connector ring is secured by a snap ring to said drill shaft.

9. The percussion drill as defined in claim 8 and further comprising biasing means for resiliently urging said coupling ring in its axial direction of shifting.

10. The percussion drill as defined in claim 9 wherein said biasing means is a spring supported at said coupling ring and said connector ring or said control sleeve.

11. The percussion drill as defined in claim 7 wherein said coupling ring is shaped with an interior cam formation recess, and further comprising at least one contact head arranged at said chuck body and adapted to operatively extend into said cam formation recess of said coupling ring, wherein said cam formation recess is comprised of two axial grooves which extend adjacent to one another, but each having a distinct length, and which are open when considered in the direction towards said control ring for the entry of said at least one contact head, wherefore said coupling ring can be turned on the chuck body to such an extent that either one or the other of the two grooves is axially aligned with said at least one contact head.

12. The percussion drill as defined in claim 11 wherein said at least one contact head includes at least one leg extending in the longitudinal direction of said grooves, and wherein the walls of said at least one leg form contact surfaces for the respective lateral walls of said grooves.

13. The percussion drill as defined in claim 11 with at least three contact heads and at least three cam formation recesses.

14. The percussion drill as defined in claim 11 wherein the respective cam surfaces form stops for a respective contact head and which limit the rotation range of said coupling ring.

* * * * *